United States Patent [19]
Gerber

[11] 3,942,781
[45] Mar. 9, 1976

[54] PENETRABLE SUPPORT

[75] Inventor: Heinz Joseph Gerber, West Hartford, Conn.

[73] Assignee: Gerber Garment Technology, Inc., East Hartford, Conn.

[22] Filed: July 22, 1974

[21] Appl. No.: 490,416

[52] U.S. Cl............ 269/289 R; 83/648; 83/925 CC
[51] Int. Cl.²...................... B23Q 3/00; B26D 7/00
[58] Field of Search............ 15/159 A; 83/648, 658, 83/925 CC; 269/289, 309, 310

[56] References Cited
UNITED STATES PATENTS

| | | | |
|---|---|---|---|
| 3,256,545 | 6/1966 | Lewis et al........................ | 15/159 A |
| 3,342,478 | 9/1967 | Shaw et al. ...................... | 269/309 X |
| 3,677,123 | 7/1972 | Gerber et al...................... | 83/658 X |
| 3,715,945 | 2/1973 | Mochizuki et al................ | 83/658 X |
| 3,735,660 | 5/1973 | Pearl................................. | 83/658 X |

*Primary Examiner*—Al Lawrence Smith
*Assistant Examiner*—James G. Smith
*Attorney, Agent, or Firm*—McCormick, Paulding & Huber

[57] ABSTRACT

A cutting machine having a reciprocating cutting blade is provided with a penetrable support bed for holding limp sheet material during a cutting operation. The support bed is formed from a plurality of flexible bristles held in a closely packed array. The base ends of the bristles are mounted in a binder and the free ends of the bristles have flattened heads which lie in a common plane defining the support surface on which the sheet material is spread. The flattened heads are developed by heating the free ends of the bristles in the array until they are softened and then forming the heads on the free ends. The bristles are preferably made of a thermoplastic material.

6 Claims, 7 Drawing Figures

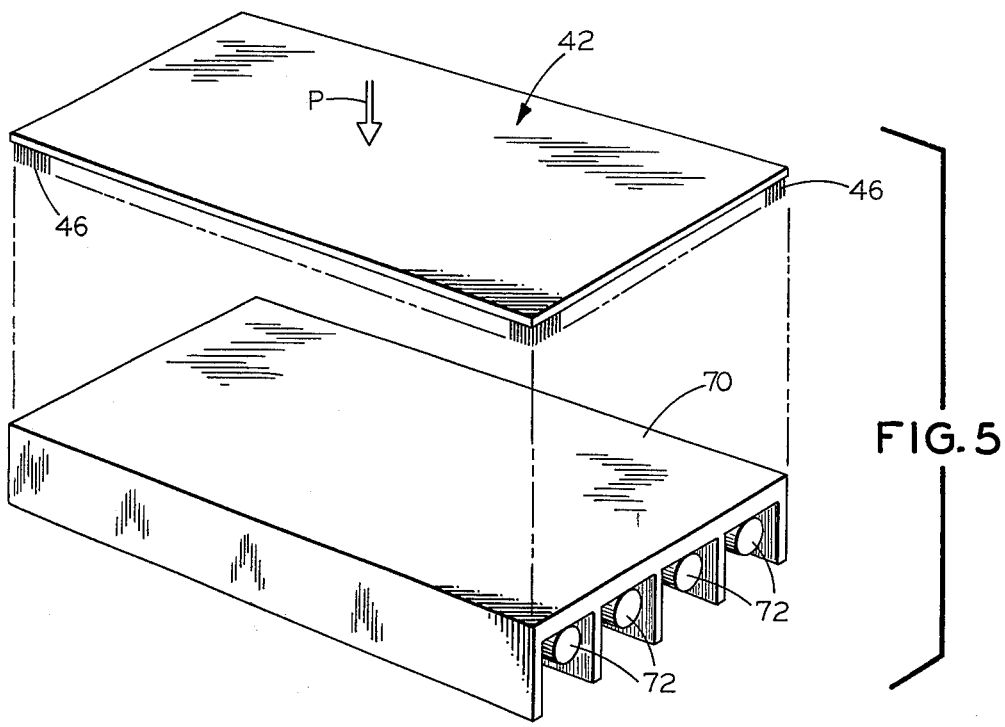
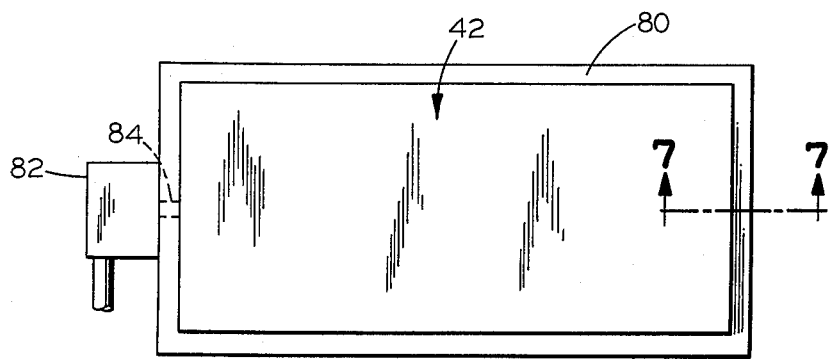
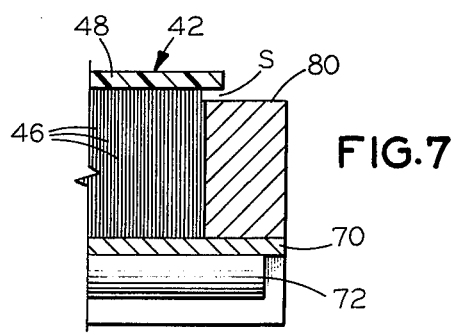

PENETRABLE SUPPORT

BACKGROUND OF THE INVENTION

The present invention relates to the field of cutting and is concerned more particularly with a support bed that is used to hold sheet material such as plastic, fabrics and leather during work operations in which the material is penetrated by a cutting tool such as a reciprocating blade, a drill, a punch or other tool.

Prior art cutting machines that are used to cut limp sheet material such as fabrics for clothing or upholstery and similar materials have utilized bristled beds for supporting the sheet material as indicated in U.S. Pat. No. 245,150 issued in 1881 entitled "Machine for Cutting Cloth" and U.S. Pat. No. 3,548,697 issued in 1970 entitled "Penetrable Bed for Cutting Sheet Material". Bristles are ideally suited for cutting layups of sheet material with a reciprocating cutting blade because the blade can penetrate through the layup in cutting relationship with the material and into the bristled bed underlying the material without damaging or destroying the bed or blade. The bristles are generally flexible and readily separate at their free ends to accommodate the reciprocating cutting blade.

Also bristle support beds by virtue of their inherent porosity provide a convenient means for drawing a vacuum below a layup of sheet material to compress and hold the material in place during a cutting operation.

One problem that exists with prior art bristle beds arises with woven fabrics, especially those having a relatively coarse or open weave that permits threads to snag or catch on the bristles. In particular, knits can be severly damaged in appearance if one thread should become snagged on a bristle as the material is either spread or removed from a bed before or after a cutting operation.

Furthermore, in most bristle beds the free ends of the bristles do not lie in precisely the same plane due to slight differences in the length of the bristles and the manner in which the bristles are mounted in a supporting material or binder which holds the bristles in a closely packed array. With some bristles slightly longer than the others or projecting slightly above the others at the support surface, there is greater friction between the surface and the material, which hinders desired sliding movements. Snagging too is promoted by the uneven bristles.

Accordingly, it is a general object of the present invention to disclose an improved support bed for holding sheet material during a work operation and to disclose the method by which such a support bed is made.

SUMMARY OF THE INVENTION

The present invention resides in a support for holding limp sheet material during a work operation and a method for making the support.

The support is comprised of a plurality of flexible, elongated members, preferably thermoplastic bristles, which are supported from their base ends in side-by-side relationship and in a closely packed array. The base ends of the members are anchored in a binder or mat and the opposite, free ends of the members have flattened heads which lie substantially in a common plane to define the support surface for the limp sheet material.

The support is made by taking a bristled mat and heating the free ends of the bristles until they are softened. The softened ends are then formed with the flattened configuration by, for example, pressing the bristles collectively against a plate. Since all of the bristles are flattened by the plate, the heads of the bristles lie in a common plane which defines the support surface. The heating and forming steps can be performed simultaneously by heating the plate and pressing the bristles and the plate together.

BRIEF DESCRIPTION OF THE DRAWINGS

FIG. 5 is a perspective view illustrating one manner in which flattened heads are formed on the free ends of the bristles in accordance with the present invention.

FIG. 6 is a plan view of a bristled mat and a vacuum fence circumscribing the mat to hold the bristles in place during the formation of flattened heads on the free ends of the bristles.

FIG. 7 is a fragmentary sectional view of the apparatus in FIG. 6 as viewed along the sectioning line 7—7.

DESCRIPTION OF THE PREFERRED EMBODIMENTS

Figure 1:
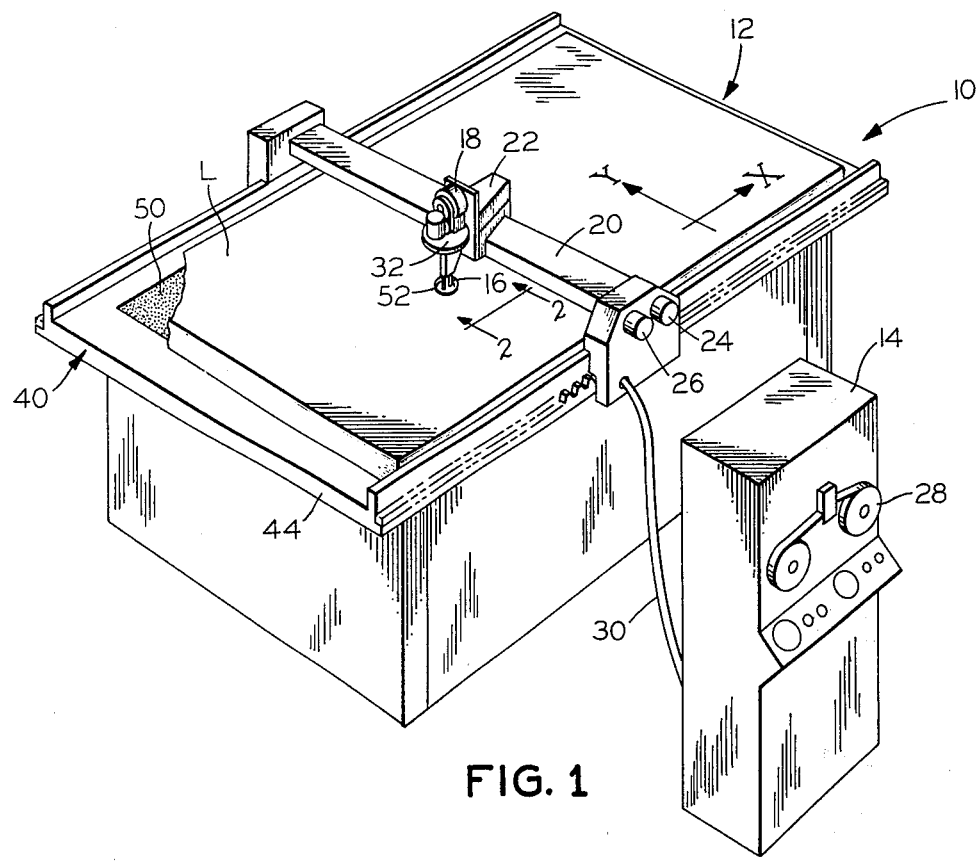
FIG. 1 is a perspective view showing an automatically controlled cutting machine having a cutting table utilizing the penetrable support bed of the present invention.

FIG. 1 illustrates an automatically controlled cutting apparatus, generally designated 10, having a cutting table 12 which utilizes the support bed of the present invention. A numerical controller 14 is included in the apparatus 10 for controlling the cutting operation.

The table 12 includes a reciprocating cutting blade 16 driven by a motor 18 and mounted on a carriage system including an X-carriage 20 and a Y-carriage 22 for movement over the table 12 in the illustrated X- and Y-directions. Motions of the blade 16 and the X-carriage 20 in the illustrated X-coordinate direction are produced by an X-drive motor 24. Motions of the blade 16 and the Y-carriage 22 relative to the X-carriage 20 and the table in the Y-coordinate direction are produced by a Y-drive motor 26.

Blade displacement or position commands are derived from a program tape 28 on the controller 14 and are transmitted to the drive motors 24 and 26 by means of the cable 30. Commands are also transmitted from the controller to the platform 32 on the Y-carriage 22 to rotate the blade about its own axis and to lift the reciprocating cutting blade 16 in and out of cutting engagement with the sheet material spread on the table 12. Control of the reciprocating cutting blade 16 and movements of the blade in cutting engagement with sheet material are conventional and well known in the art. Further discussion of the control system is, therefore, not considered essential for an understanding of the present invention.

Sheet material is spread on the penetrable bed 40 of the table 12 in a multi-ply layup L for cutting by the reciprocating blade 16. The bed 40 is comprised of a bristled mat or mats 42 shown in greater detail in FIG.

2 and a base or frame 44 of the bed on which the mats lie. Flexible bristles 46 in the mats 42 have base ends anchored in a binder 48, such as a thick polyvinyl plastic sheet, and are supported in the binder in side-by-side relationship and a closely packed array. The bristles extend from the binder upwardly to their free ends opposite the base ends and define the support surface 50 of the bed 40 on which sheet material is spread.

During a cutting operation, the cutting blade 16 is reciprocated through the sheet material and into the bed of bristles 46 along a vertical axis perpendicular to the plane of the support surface 50. The reciprocating blade is also translated along a cutting path defined at the periphery of a pattern piece to be cut from the material. A presser foot 52 circumscribes the reciprocating blade 16 and rests on the upper ply of the sheet material to hold the material in place. If desired, a vacuum may be produced in the region occupied by the bristles below the sheet material to further compress and hold the material during the cutting operation as explained in greater detail in U.S. Pat. No. 3,495,492 issued to the Assignee of this application.

Figures 2, 3, 4:
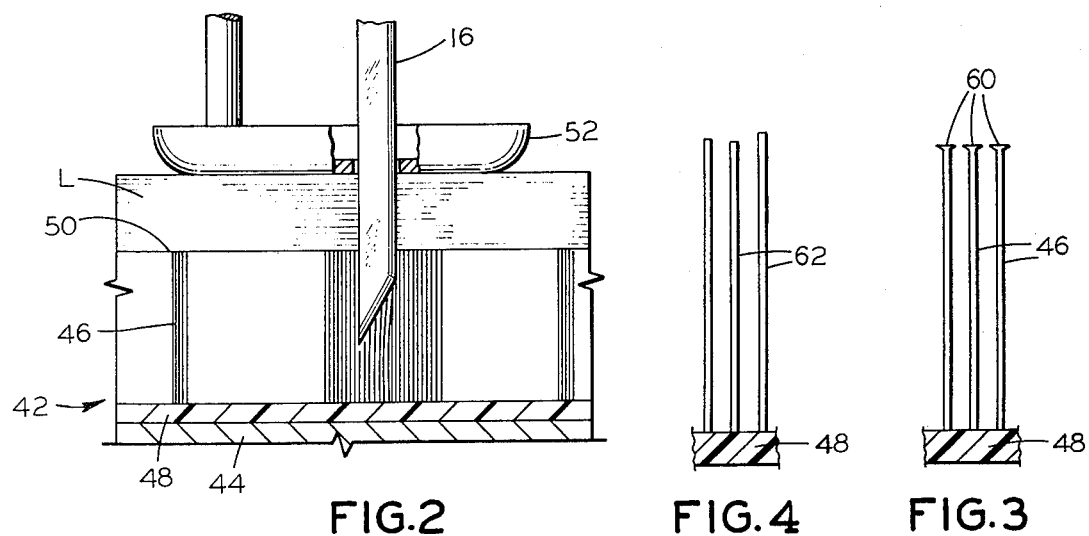
FIG. 2 is a fragmentary cross-sectional view of the support bed annd a cutting tool as viewed along the sectioning line 2—2 in FIG. 1.
FIG. 3 is an enlarged fragmentary view of a bristled mat in accordance with the present invention.
FIG. 4 is an enlarged fragmentary view of a bristled mat prior to modification in accordance with the method of the present invention.

In accordance with the present invention, the free or upper ends of the bristles 46 are provided with enlarged, heads 60 as illustrated in FIG. 3. The bristles 46 with flattened heads on the free ends offer a number of advantages over conventional bristles 52 illustrated in FIG. 4.

The heads 60 substantially increase the actual support area on which the sheet material is held when the heads are formed in a common plane on the free ends as illustrated in FIG. 3. When the diameter of a head is approximately twice the diameter of the bristle as illustrated, the support area is four times greater than that provided by the conventional bristle. The heads 60 greatly reduce the chances of the sheet material becoming snagged on the bristles which could result in damage to the material. It will be observed that although the conventional bristles in FIG. 4 have substantially the same length and, therefore, lie substantially in a common plane, one bristle projecting slightly above the others can readily catch or snag limp fabric material, particularly materials having a coarse or open weave such as a knitted material. The flattened heads 60 with greater surface area confronting the material are better adapted to preventing the material from settling over the free ends of the bristles particularly when pressure is applied to the material by means of the pressure foot 52 or vacuum produced below the support surface defined by the heads. The greater resistance of the heads to settling makes the support surface appear to be more firm so that the blade 16 has an apparently harder surface to cut the material on.

The flattened heads 60 are also formed in a manner described below so that they lie in the same plane. Accordingly, the propensity for a longer bristle to snag the sheet material or increase friction between the material and the bed is reduced. With a uniform height, each of the bristles tends to support the sheet material and contributes to the lateral stability of the material. Therefore, although friction is reduced to make sliding movements of the material over the bed easier to accomplish without stretching, overall lateral stability of the material on the table 12 is improved.

Furthermore, the flattened heads contact one another when the flexible bristles are slightly flexed and the free ends are deflected. Accordingly, the bristles reinforce one another, and the support surface defined by the bristles is more rigid for holding the sheet material more firmly in place.

The heads 60 also offer more resistance to threads and lint which are forced downwardly into the penetrable bed by the reciprocating blade in a cutting operation. Clogging of the bristles with such accumulated debris is undesirable because it ruins the penetrability of the bed 40.

Even though the heads 60 provide an improved support surface for the sheet material, the reciprocating cutting blade 16 penetrates with ease through the surface by separating the flexible bristles along the cutting path. The bristles merely deflect away from the knife and return to their original position after the knife has passed without suffering any permanent damage. Accordingly, the penetrable bed 40 is self-healing and not expended by one or a multitude of cutting operations.

One method of making the bristled mats with the heads 60 in FIG. 3 from the more conventional bristled mats illustrated in FIG. 4 is shown in FIGS. 5–7. In this method it is assumed that the bristles 46 are made from a thermoplastic material such as polypropylene or some other material that softens when exposed to a moderate heat. Typically the bristles have a diameter of approximately 1/32 inch (0.8 millimeters) and a length of 1 inch (2.5 cm). Preferably, the bristles do not have a diameter larger than 1/16 inch (1.6 millimeters) and such bristles are arranged in a closely packed array of hot less than 200 per square inch (31 per square centimeter). Other flexible, elongated members such as metal pins can also be provided with flattened heads; however, the commercial availability of bristled mats renders their use as a penetrable support bed more convenient.

To form the flattened heads 60 on the ends of conventional bristles shown in FIG. 4, a bristled mat 42 is placed on a plate 70 shown in FIG. 5 after the plate has been heated to a temperature approximately equal to the melting temperature of the flexible bristles 46. The plate 70 is an aluminum plate under which a plurality of evenly spaced heating rods 72 extend to transfer heat into the plate. The high heat conduction factor of aluminum is desirable so that local hot spots are avoided and a uniform temperature is developed across the entire surface of the plate which confronts the mat 42. In the case of polypropylene bristles the plate is heated to a temperature in the range of 295°–305° F. and then the free ends of the bristles 46 are placed in contact with the plate until they soften.

While the bristles 46 and the heated plate 70 are in contact, a slight pressure P is applied to the mat. Although the pressure P is represented by an arrow in FIG. 5, in fact, the pressure should be applied uniformly over the entire area of the mat so that each of the bristle 46 is exposed to substantially the same pressure. A uniform and controlled pressure P can be applied by laying a weight upon the entire exposed surface of the mat 42 so that the support for the weight is derived uniformly from each portion of the mat. If the mat itself is of sufficient weight, no additional pressure may be needed. As the ends soften the flattened heads 60 are formed in a common plane defined by the surface of the heated plate 70. The mat 42 and the plate 70 are then separated and the heads 60 cool and set. To insure separation without damaging the soft heads 60 or the bristles 46, it is desirable that the plate 70 be coated with a silicone release agent.

Several precautions should be observed during the formation of the heads 60. The time that the bristles 46 and plate 70 are in contact must be long enough to soften the free ends of the bristles but cannot be so long that the free ends melt and fuse with the adjacent bristles. If the bristles fuse together, they must be separated thereafter to allow a reciprocating cutting blade or other tool to penetrate the array with ease.

Furthermore, the temperature of the plate, the pressure P and the heating time must be correlated with one another so that, for example, the pressure is not too great for the degree of softening caused by the heated plate.

FIGS. 6 and 7 illustrate another method of applying pressure to the mat and controlling the degree to which the mat settles as the free ends of the bristles are flattened. A vacuum fence 80 is positioned around the periphery of the bristles and is connected to a vacuum pump (not shown) through a manifold 82. The fence 80 may be made of metal or other suitable material and rests on the plate 70. Vacuum is then drawn within the region of the bristles 46 through the manifold 82 and a passageway 84 in the fence 80.

The vacuum fence 80 holds the bristles along the periphery of the mat in a vertical position and prevents the bristles from spreading under the pressure applied to the mat when the vacuum is drawn. The pressure can be readily controlled by regulating the vacuum in the manifold 82, and a pressure in the order of ¾ inches of water is contemplated.

The vacuum fence 80 also serves to limit the degree that the free ends of the bristles are flattened by limiting the distance that the mat 42 can settle as the softened ends of the bristles are crushed. Note particularly in FIG. 7 the small space S that exists between the binder and the upper side of the fence 80. If such spacing interferes with the process of drawing a vacuum within the bristles 46, the mat 42 and the fence 80 can be covered with an air-impermeable overlay such as a thin sheet of polyethylene plastic.

In summary, a penetrable support bed for holding limp sheet material during a cutting operation is formed by a plurality of closely packed bristles having flattened heads which lie in the support plane of the bed. The flattened heads are formed on the free ends of the bristles by pressing the bristled mat against a heated plate so that the free ends of the bristles are softened and formed in a common plane established by the surface of the plate.

While the present invention has been described in a preferred embodiment, it will be readily understood that numerous modifications and substitutions can be had to the disclosed support and method of making the support without departing from the spirit of the invention. As stated above, elongated members other than thermoplastic bristles may be utilized to form the support bed as long as the members are capable of flexing when a reciprocating blade 16 penetrates through sheet material into the bed. The dimensions referred to above in connecting with the bristles are exemplary of commercially available thermoplastic bristles and may vary if metallic bristles or pins are utilized. It is preferable that the heads have a diameter at least twice as large as the bristles. The parameters referred to in connection with the heating plate 70 and the pressure applied to mat 42 to form the flattened heads are generally applicable to thermoplastic bristles but may be varied to suit other materials. The heated plate 70 can be placed on top of the free ends of the bristles during the formation of the heads, or the plate and bristles can be pressed together in a position other than horizontal. The heads 60 can also be developed on the bristles by simultaneously heating and forming the free ends with a heated roller which rolls over the bristles at a standard height above the binder 48. Accordingly, the present invention has been described in several forms by way of illustration rather than limiation.

I claim:

1. In combination in a machine having a cutting tool which penetrates through a material in a work operation, the improvement comprising:
   a penetrable bed for supporting the material under the tool during the work operation and having a plurality of flexible, elongated members supported at their base ends in side-by-side and closely packed relationship with the opposite, free ends bearing enlarged heads lying substantially in a common plane to define a support surface of the bed.

2. The improvement as defined in claim 1 wherein:
   the flexible, elongated members are bristles formed from a thermoplastic material.

3. The improvement as defined in claim 1 further including:
   a binder supporting the elongated members at their base ends in the closely packed relationship.

4. The improvement as defined in claim 3 wherein:
   the elongated members are thermoplastic bristles; and
   the binder comprises a plastic material in which the base ends of the bristles are imbedded.

5. The improvement as defined in claim 1 wherein the elongated members are bristles having a diameter less than one sixteenth inch (1.6 mm) and wherein the enlarged heads have a diameter at least twice as large as the bristles.

6. The improvement as defined in claim 1 wherein the bristles are packed in an array of no less than 200 per square inch (31 per sq cm).

* * * * *